(12) United States Patent
Orrigoni

(10) Patent No.: US 8,042,706 B2
(45) Date of Patent: Oct. 25, 2011

(54) PROFILE FOR PANELS AND METHOD FOR ITS FASTENING

(75) Inventor: Valentino Orrigoni, Legano (IT)

(73) Assignee: Dante Bertoni S.R.L., Cairate, VA (IT)

(*) Notice: Subject to any disclaimer, the term of this patent is extended or adjusted under 35 U.S.C. 154(b) by 312 days.

(21) Appl. No.: 12/375,602

(22) PCT Filed: Jun. 1, 2007

(86) PCT No.: PCT/IT2007/000384
§ 371 (c)(1), (2), (4) Date: Mar. 13, 2009

(87) PCT Pub. No.: WO2008/015711
PCT Pub. Date: Feb. 7, 2008

(65) Prior Publication Data
US 2010/0230425 A1  Sep. 16, 2010

(30) Foreign Application Priority Data
Aug. 1, 2006  (IT) ............... MI2006A1533

(51) Int. Cl.
 B65D 1/42 (2006.01)
 B65D 6/34 (2006.01)
 B65D 8/08 (2006.01)
(52) U.S. Cl. ...................... 220/642; 220/650

(58) Field of Classification Search .......... 220/639, 220/642, 643, 646, 658, 650
See application file for complete search history.

(56) References Cited

U.S. PATENT DOCUMENTS

| | | | |
|---|---|---|---|
| 2,581,613 A * | 1/1952 | Ullrich | 220/491 |
| 4,959,081 A | 9/1990 | Mathellier | |
| 5,638,983 A * | 6/1997 | Bazany | 220/642 |
| 6,460,724 B1 * | 10/2002 | Bradford | 220/642 |
| 2004/0164082 A1 | 8/2004 | Schutz | |

FOREIGN PATENT DOCUMENTS

| | | |
|---|---|---|
| DE | 4414378 A1 | 10/1995 |
| DE | 20019341 U1 | 12/2001 |

* cited by examiner

*Primary Examiner* — Harry Grosso
(74) *Attorney, Agent, or Firm* — Lucas & Mercanti, LLP

(57) ABSTRACT

A profile (2) comprises a rounded upper portion (6) and a lower portion (7) and is suitable for being fastened onto an edge (3) of a panel (4a) by means of fastening means (5). The lower portion (7) comprises a first wall (7a) suitable for mating with the panel (4a) and a second wall (7b) joining said first wall (7a) to said upper portion (6), thus defining a chamber (8) that is comprised between the first wall (7a) and the second wall (7b) and is suitable to enclose one end (10) of said fastening means (5). Thus, the profile accomplishes an anti-catching function. The present invention also relates to a method for fastening said profile (2) town edge (3) of a panel (4a).

16 Claims, 1 Drawing Sheet

PROFILE FOR PANELS AND METHOD FOR ITS FASTENING

The present invention relates to a profile for panels and particularly to a profile which allows to completely hide the ends of the fastening means anchoring it to the panel, thus accomplishing an anti-catching function. The invention also relates to a method for fastening the above-mentioned profile to a panel.

In industrial plants such as industrial laundries, textile plants and the like, it is known the use of containers for the transport of materials. The containers are generally made up of a bottom and a peripheral wall, constrained thereto, made of a series of panels. Such containers may also be provided with a series of wheels fixed to the bottom, which facilitate its moving, i.e. the containers may be used as carts.

The container may have different shapes depending on the use, for instance a prismatic or a cylindrical shape. Still depending on the use, the various parts of the container may be made of different materials such as, for example, zinc-coated sheet-metal, aluminum, thermoplastic materials, etc.

In general, on the upper edge of the panels forming the peripheral wall of the container a rounded profile is present, providing the user with a safe grip for the manoeuvre. The profile also carries out a stiffening function for the panels, which are constrained to the bottom of the container only. It is also known the use of profiles both on the upper and on the lower edge of the panels, in order to further stiffen the container. Finally, the profiles also carry out an aesthetic function for the container, as they are finishing elements variably configurable in terms of shapes, colors and materials.

The profiles may be directly formed on the panels, e.g. by folding back the edge in order to form a rounded appendix, or they may be separately manufactured and fastened to the panels, e.g. by means of rivets, screws or similar fastening means. The manufacturing of profiles separated from the panels is the most used solution as it allows the maximum freedom in the materials choice and simplifies the fastening.

In general, the profile is made of a sheet of metal material, for example a zinc-coated sheet-metal, which is folded back is order to form a rounded appendix. In the case of cylindrical containers, whose peripheral wall consists of a single curved panel, the profile is, for instance, a U-shaped profile that is inserted on the edge of the panel and then plastically deformed by means of a beading machine. This deformation has the effect of anchoring the profile to the edge of the container, thus making the two parts integral.

On the contrary, in the case of containers with a prismatic shape, e.g. square or rectangular, whose peripheral wall is made up of a plurality of substantially flat panels, it is not possible to use beading machines due to the presence of edges between the panels, thus the profile is generally anchored to the panels of the container by using fastening means such as, for instance, bolts or rivets. Generally, the profiles employed for prismatic-shaped containers consist of a rounded upper portion and a flat lower portion that is approached to the inner surface of the panels of the container during the fastening step so that the rounded upper portion completely protrudes beyond the edge of the panels. On the external surface of the panels a counter-plate is arranged and then through-holes are made through the flat lower portion of the profile, the panels of the container and the counter-plate. Successively, fastening means suitable for joining the parts together, usually bolts or rivets, are inserted into the holes.

The head of the bolts or rivets is generally exposed to the inside of the container, whereas the other end protrudes to the outside of the container. This avoids the possibility that the materials transported in the container, e.g. yarns or fabrics, catch the protruding ends of the bolts or rivets during their handling in and out from the container, thus being damaged.

Further, in the case of transport of yarns for textile processings, it is important that the yarns of a material previously transported do not catch the fastening bolts or the rivets, consequently mixing with the yarns of other materials and potentially compromising the subsequent processings and/or altering the quality of the finished product.

However, upon fastening, the head of the bolts or rivets does not always perfectly adhere to the inner surface of the panels of the container, thus leaving small interstices that may catch strips of fabric and/or yarns.

In addition, the fastening operations of the known profiles are rather complex due to the fact that a counter-plate supporting and spreading the contact pressures generated by the screwing of the bolts or rivets must be arranged outside the container, in order to avoid undesired deformations on the panels of the container. In order to drill and subsequently fasten the profile, the counter-plate must be deformed around the container and kept aligned manually or, for instance, by means of clamps. These operations are time-consuming and do not always lead to satisfying results in the finishing of the edges of the panels of the container.

It is therefore an object of the present invention to provide a profile for a panel and a fastening method, which are free from the above-mentioned disadvantages. Such an object is achieved with a profile and a method, whose main features are disclosed in claim 1 and claim 16, respectively, while other features are disclosed in the remaining claims.

The profile according to the present invention allows to completely hide one end of the fastening means in a suitable chamber. Therefore, for example, in the transport of woven materials in a container provided with such a profile, said materials can not be caught in any way by the fastening means and can be handled in a safe way.

A first important advantage of the profile and the fastening method according to the present invention is that the profile is provided with alignment and support surfaces for the panel, allowing its stable positioning without requiring the use of temporary blocking means.

A second advantage of the profile and the method according to the present invention is that the profile can be fastened to both cylindrical and prismatic containers, by means of a single fastening procedure that requires neither the use of additional parts such as a counter-plate, nor particular tools such as a beading machine.

A third advantage of the profile and the fastening method of the present invention is that in addition to carry out an anti-catching function, the profile offers an improved grip for the handling of the container.

A fourth advantage of the profile according to the present invention is that it can be also used as a finishing and protecting member for beading thin building elements similar to the panels.

Further advantages and features of the profile and the fastening method according to the present invention will become clear to those skilled in the art from the following detailed and non-limiting description of some embodiments thereof with reference to the attached drawings, wherein.

Figure 1:
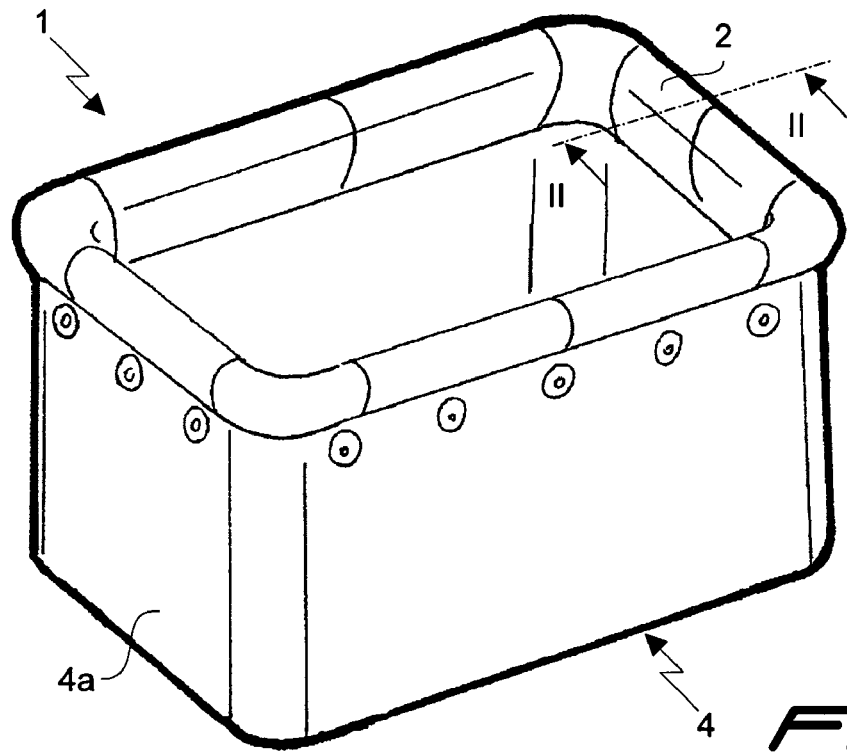
FIG. 1 shows a perspective view of a container provided with a profile according to the present invention.
Figure 2:
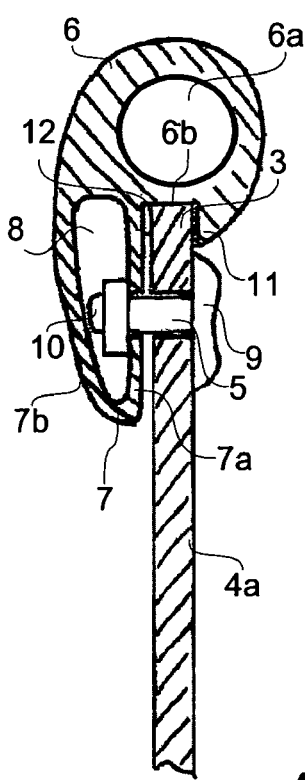
FIG. 2 shows a partial cross-sectional view II-II of the container of FIG. 1.

FIGS. 1 and 2 show, in perspective and partial cross-sectional views, respectively, a prismatic-shaped container 1 with a rectangular base, provided with a profile 2 assembled on upper edge 3 of its peripheral wall 4. Peripheral wall 4 is formed of a plurality of panels 4a connected one to the other and suitably connected. Profile 2 is fastened to container 1 by fastening means 5, e.g. rivets.

Profile 2 according to the present invention comprises a rounded upper portion 6 and a lower portion 7. Upper portion 6 has a longitudinal inner cavity 6a that allows to lighten profile 2 and can be used as a seat for an insertion pin for closing profile 2. Lower portion 7 comprises a first wall 7a suitable to mate with panels 4a of peripheral wall 4 of container 1, and a second wall 7b connecting said first wall 7a to said upper portion 6 in order to define a chamber 8, which is comprised between first wall 7a and second wall 7b and is suitable for enclosing the ends of fastening means 5 facing container 1. In such a way, the material transported in container 1 is prevented from catching the ends of fastening means 5, thus obtaining an anti-catching profile.

Contrary to the solution adopted in the fastening of the profiles according to the prior art, head 9 of fastening means 5 is arranged on the external surface of panels 4a of peripheral wall 4 of container 1, whereas end 10, opposite to head 9, is housed in chamber 8. By inserting fastening means 5 in the opposite direction with respect to the solution of the prior art, the use of any counter-plate for fixing profile 2 is no longer necessary, as the contact pressures due to the fastening forces exerted by fastening means 5 on panels 4a of peripheral wall 4 are directly withstood and spread out by first wall 7a of lower portion 7. This remarkably simplifies the fastening operations, as the use of a counter-plate is no longer necessary. Further, profile 2 can be used both on cylinder-shaped containers 1 and prismatic-shaped containers 1, e.g. square or rectangular, with the same fastening method and with no need for beading machines.

Upper portion 6, lower portion 7 and chamber 8 of profile 2 are manufactured in a single piece. In addition, second wall 7b of lower portion 7 is joined to upper portion 6 forming a single smooth and compact external surface. Second wall 7b of lower portion 7 may have various shapes such as, for example, flat or convex, in order to provide an improved grip for the manoeuvre of container 1 in addition to the anti-catching function.

Rounded upper portion 6 exhibits a lower wall 6b substantially flat and perpendicular to first wall 7a of lower portion 7. Such walls 6b and 7a are suitable to abut onto edge 3 of panels 4a of peripheral wall 4 of container 1, thus allowing an optimal alignment and providing a stable support during the fastening of profile 2.

In addition, rounded upper portion 6 is provided with a longitudinal protrusion 11 opposed to first wall 7a of lower portion 7, which defines together with lower wall 6b of rounded upper portion 6 and first wall 7a a seat 12 suitable for receiving edge 3 of panels 4a of peripheral wall 4 of container 1. Seat 12 can advantageously be dimensioned in order to allow to block profile 2 onto edge 3 in the fastening step, for example by means of a press fit of profile 2 onto edge 3. This further facilitates the fastening operations by improving the alignment between the parts, and allows to obtain a remarkable stiffening of panels 4a of peripheral wall 4 of container 1 once fastened.

Profile 2 according to the present invention may also be used for the beading of thin building elements similar to panels 4a, as a finishing and protecting member with an anti-catching function.

Profile 2 is obtained, for instance, by starting from extruded linear bars and is provided ready for the fastening on container 1, i.e. already shaped correspondingly to the shape of peripheral wall 4 of container 1. Suitable materials for the manufacturing of profile 2 may be, for example, aluminum alloys or polymeric materials.

Figure 3:
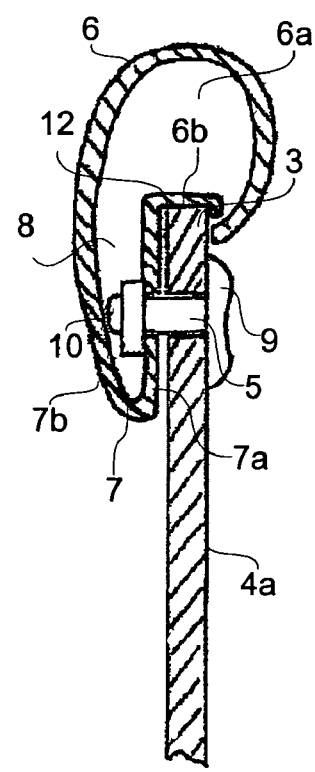
FIG. 3 shows a partial cross-sectional view of a profile according to an alternative embodiment.

Referring to FIG. 3, in an alternative embodiment, profile 2 can be manufactured by folding starting from a sheet of metal, e.g. a zinc-coated sheet-metal, folding the sheet-metal initially forming seat 12, successively lower portion 7 and chamber 8 and finally rounded upper portion 6.

In a further alternative embodiment, profile 2 can be manufactured by deformation starting from a pipe, deforming its cylindrical wall in order to form seat 12, lower portion 7, chamber 8 and rounded upper portion 6.

Possible modifications and/or additions may be made by those skilled in the art to the hereinabove disclosed and illustrated embodiments while remaining within the scope of the following claims. For example, anti-shock protections made of an elastomeric material may be applied along profile 2.

The invention claimed is:

1. A container for transport of materials, comprising:
a profile arranged on an upper edge of a peripheral wall, wherein said profile is fastened to the peripheral wall by fastening means and comprises a rounded upper portion and a lower portion, said lower portion comprising a first wall suitable for mating with the peripheral wall and a second wall which connects said first wall to said upper portion, said first and second walls defining a chamber suitable for enclosing one end of said fastening means and
wherein the second wall of the lower portion is joined to the upper portion forming a single smooth and compact external surface.

2. The container according to claim 1, wherein said rounded upper portion has a lower wall substantially flat and perpendicular to the first wall, said walls being suitable to abut onto the edge of the peripheral wall.

3. The container according to claim 2, wherein said rounded upper portion is provided with a longitudinal protrusion, opposed to the first wall, which defines together with said lower wall of the rounded upper portion and said first wall a seat suitable for receiving the edge of the peripheral wall.

4. The container according to claim 1, wherein said rounded upper portion and said lower portion are manufactured in a single piece.

5. The container according to claim 1, wherein the second wall of the lower portion has a convex shape.

6. The container according to claim 1, wherein the upper portion has an internal longitudinal cavity suitable for lightening the profile and for being used as a seat for an insertion pin for closing the profile.

7. The container according to claim 1, wherein the profile is obtained from an extruded profiled bar.

8. The container according to claim 1, wherein the profile is manufactured from a pipe by means of deformation.

9. The container according to claim 1, wherein the profile is made of sheet-metal.

10. The container according to claim 1, wherein the profile is made of an aluminum alloy.

11. The container according to claim 1, wherein the profile is made of a polymeric material.

12. The container according to claim 1, wherein said fastening means are rivets.

13. A method for fastening a profile on the edge of a peripheral wall of a container comprising the following steps:

arranging said profile on the edge of said peripheral wall;
making through-holes through said profile and said peripheral wall; and
fastening said profile on the edge of said peripheral wall by fastening means inserted in the through-holes,
enclosing one end of said fastening means is enclosed in a chamber of the profile,
wherein said chamber is defined by a second wall of a lower portion of the profile, which is joined to the upper portion of the profile, thereby forming a single smooth and compact external surface.

14. The method according to claim 13, wherein said one end of the fastening means is enclosed in a chamber formed in the profile.

15. The method according to claim 14, wherein said fastening means are inserted and fastened from the side of the peripheral wall opposed to the chamber.

16. The method according to claim 13, wherein said profile is press-fitted on the edge of the peripheral wall, the edge being received into a seat formed in the same profile.

* * * * *